Oct. 31, 1950     S. P. ROBINSON     2,527,964
SEPARATION OF GASES
Filed Nov. 18, 1946
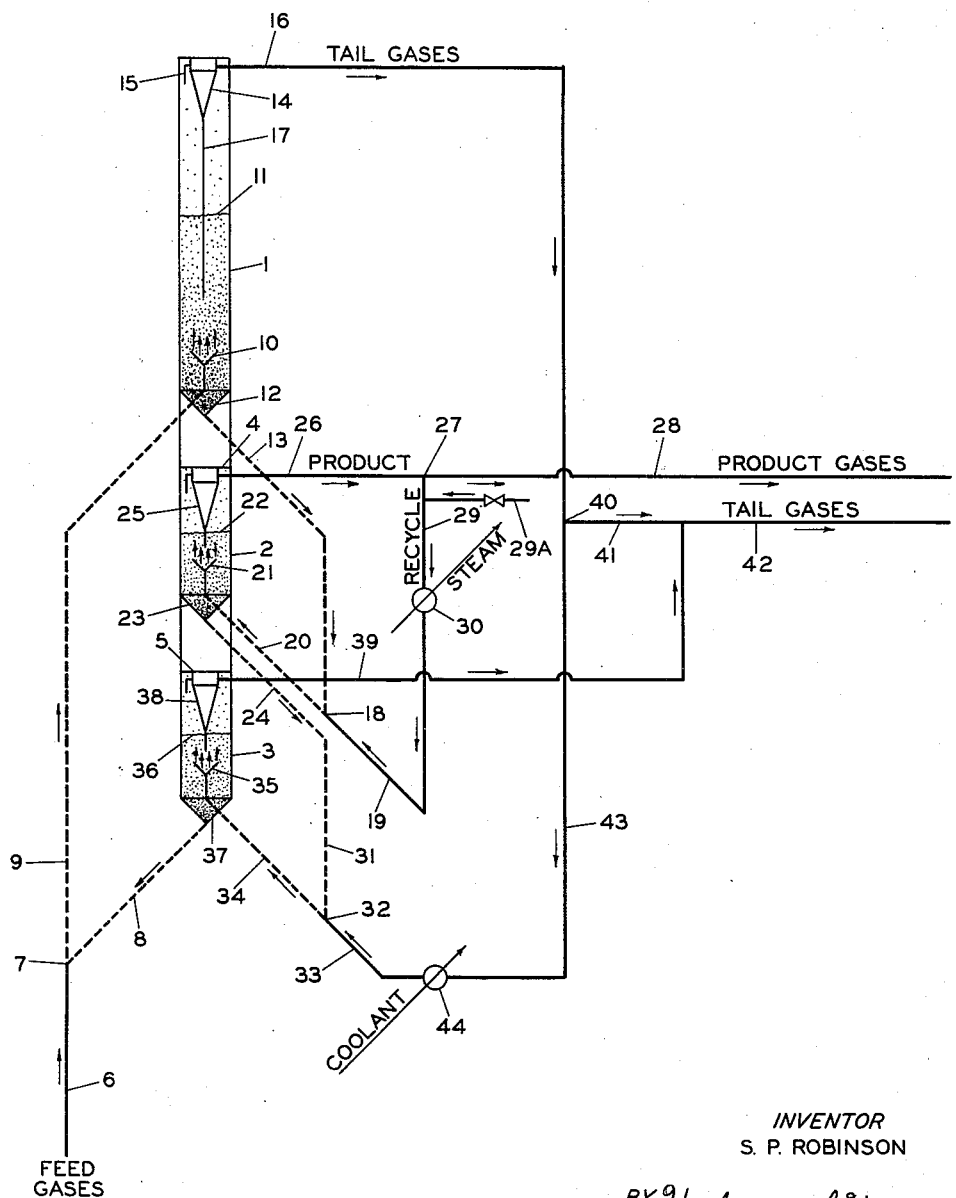
INVENTOR
S. P. ROBINSON
BY Hudson and Young
ATTORNEYS

UNITED STATES PATENT OFFICE 2,527,964

SEPARATION OF GASES

Sam P. Robinson, Bartlesville, Okla., assignor to Phillips Petroleum Company, a corporation of Delaware Application November 18, 1946, Serial No. 710,468

14 Claims. (Cl. 183—114.2)

This invention relates to a process and apparatus for separating a gaseous mixture into two fractions by a sequence of steps involving adsorption of one fraction on a finely divided solid adsorbent followed by stripping of the adsorbed fraction in a separate zone.

It has been proposed to contact the feed gas countercurrently and continuously with a moving bed of granular adsorbent. Such a process is described for example in the paper by Clyde Berg appearing in Transactions of A. I. Ch. E., vol. 42, pages 665–680 (August 25, 1946). The present invention provides a system of separating gases into two fractions which is far superior in many respects to such a process which has become known as "Hypersorption."

The principal object of the present invention is to provide an improved process and apparatus for separating gases into several fractions. Another object is to provide such a process and apparatus wherein far greater utilization of the adsorbent is attained than in moving bed systems. Another object is to effect great savings in initial construction costs and in operation of such a separation system. Another object is to effect improved adsorption, stripping and cooling of solid adsorbent in a process of the foregoing type. Another object is to effect the cooling of the stripped adsorbent in a superior manner preparatory to recycling the adsorbent to the adsorption step. Another object is to effect stripping of the rich adsorbent in an improved manner. Numerous other objectives will more fully hereinafter appear.

The accompanying drawing portrays diagrammatically in vertical longitudinal section one arrangement of equipment which is highly preferred for carrying out the present invention.

In one process aspect the present invention accomplishes separation of a gaseous mixture into two fractions by suspending a finely divided solid adsorbent in the mixture to be resolved under conditions such as to effect adsorption of the desired fraction of the mixture by the adsorbent, separating the resultant adsorbent from the unadsorbed fraction or tail gas, suspending the rich adsorbent in a heated recycle stream of stripped product gas under conditions such as to effect desorption of the adsorbed fraction from the adsorbent as a result of the heat derived from the hot recycle product gas, separating the resulting stripped adsorbent from the stripping and desorbed product gas, suspending the resulting stripped adsorbent in a cooled recycle stream of the unadsorbed or tail gas under conditions such as to effect cooling of the adsorbent to a temperature suitable for its reintroduction to the adsorbing step, separating the resulting cooled adsorbent from the resulting tail gas, and recycling the cooled adsorbent to the first-named suspending step.

My invention is based not only on the discovery that markedly improved results can be obtained by suspending a finely divided solid adsorbent in the feed gas, the stripping gas and the cooling gas in the adsorbing, stripping and cooling zones respectively but also on the discovery that much improved results can be obtained by heating a portion of the adsorbed or product gas and employing this for stripping and by cooling a portion of the unadsorbed or tail gas and using the thus cooled tail gas for cooling the adsorbent to remove the heat imparted thereto in the stripping operation.

I believe that I am the first to provide a process wherein the finely divided solid adsorbent is suspended in the feed gas under conditions such as to effect the desired adsorption, and the resulting rich adsorbent, after separation from the unadsorbed gas in any suitable manner, is desorbed by suspending it in a heated recycle stream of stripped product gas. This feature of my invention is highly advantageous because contamination of the adsorbent or of the desorbed product with the heated stripping medium is completely avoided since the heated stripping medium is itself a portion of the desorbed product gas. In addition heat transfer is nearly perfect as compared to the poor heat transfer obtained when indirect means of heating the solid adsorbent such as coils located in the bed of adsorbent are employed in accordance with prior practice.

I also believe that I am the first to provide a process wherein the finely divided solid adsorbent is suspended in the feed gas under conditions effecting adsorption of the desired fraction of the feed gas by the adsorbent followed by stripping of the separated adsorbent and wherein the hot stripped adsorbent is cooled by suspending it in a cooled recycle stream of tail gas thereby effecting cooling of the adsorbent to a temperature suitable for recycle to the adsorption step. This feature also is highly advantageous over the customary methods of cooling the hot stripped adsorbent before re-introducing the same to the adsorption step. One advantage is that the tail gas is readily available being made continuously by the process. Furthermore the adsorbent is not contaminated by an extraneous gaseous medium as would be the case were such an extraneous medium employed instead of tail gas for direct contant cooling of the adsorbent. Cooling the tail gas before suspension of the hot finely divided adsorbent therein and passage of the resulting suspension into the cooling zone is advantageous among other reasons because erosion of the cooler or heat exchanger is eliminated whereas if the adsorbent were suspended in the stream of recycled tail gas and the resulting suspension passed through a heat exchanger or cooler, erosion would be a serious problem. Furthermore heat transfer between the cooled gas and the finely divided solid adsorbent suspended therein is very good as compared with the poor heat transfer obtained when cooling coils or other indirect cooling means are employed.

The process of my invention is preferably carried out in the following manner. The finely divided solid adsorbent is suspended in a stream of the gaseous mixture employed as feed and the resulting suspension is introduced upwardly into the adsorbing zone. Conditions in the adsorbing zone are maintained such as to effect adsorption of the desired component or components of the feed by the adsorbent. The rich adsorbent is allowed to settle to the bottom of the adsorbing zone and is withdrawn therefrom in the form of a relatively compact mass. Tail gas free from adsorbent is withdrawn from the upper portion of the zone. The withdrawn rich adsorbent is suspended in a heated recycle stream of stripped product gas and the resulting suspension is introduced upwardly into the stripping zone where conditions are maintained such as to effect desorption of the adsorbed fraction and allow the resulting stripped adsorbent to settle to the bottom of the zone. The resulting gas is withdrawn in a condition free from adsorbent from the upper portion of the stripping zone. This gas has a composition identical with the adsorbed fraction and is made up of the adsorbed fraction and the recycled product gas employed for stripping. The gas withdrawn from the top of the stripping zone is split into two streams one of which is a product stream withdrawn from the system at a rate equal to that at which the product is entering the system in the form of feed gas and the second of which is a recycle stream which is heated and employed as the stripping medium in the stripping zone.

Stripped adsorbent is withdrawn from the bottom of the stripping zone as a relatively compact mass and is suspended in a cooled recycle stream of tail gas. Tail gas withdrawn from the adsorption zone is split into two streams namely a stream which is withdrawn from the system at a rate equal to that at which the tail gas fraction enters in the feed and a recycle stream which is cooled and used to effect cooling of the hot stripped adsorbent. The resulting suspension of stripped adsorbent in cooled recycle tail gas is introduced upwardly into the cooling zone where conditions are maintained such as to effect cooling of the adsorbent to the temperature at which it is desired to reintroduce it into the adsorbing zone. The resulting cooled adsorbent is caused to settle to the bottom of the cooling zone and is withdrawn as a relatively compact mass from said zone. The thus cooled adsorbent is recycled to the adsorbing step. The recycle gas is withdrawn from the upper portion of the cooling zone and this stream of tail gas so withdrawn may conveniently be merged with the aforesaid stream of tail gas withdrawn from the system.

As will presently appear more fully, I prefer to maintain a light gaseous phase containing a relatively low proportion of adsorbent in the upper portion of each of the three zones and a dense phase containing a relatively high proportion of adsorbent below the light phase in each zone and to effect what is known as hindered settling in the dense phase in each zone. These results are preferably effected by correlating the velocity upwardly through each zone and the weight and size of the adsorbent particles.

Any suitable type of adsorbent may be used in carrying out my invention. Examples of suitable adsorbents are activated carbon such as activated charcoal, silica gel, activated clay, activated alumina, etc.

The size of the adsorbent particles may vary within wide limits. Usually adsorbent particles of from 100- to 300-mesh are employed. Coarser particles may be used if sufficiently turbulent conditions are maintained in the three zones. By proper regulation of gas velocities, I may employ adsorbent considerably coarser than 100-mesh, say as coarse as 10- to 20-mesh. It will be understood that the size of the adsorbent particles and the other conditions are correlated to obtain the desired results.

The process of my invention has a great many applications. It may be used generally wherever a gaseous material contains a component or components which can be selectively adsorbed on a finely divided solid adsorbent. The process of my invention is readily adapted to such widely divergent applications as removal of a major constituent from a gas stream and the removal of relatively minor but valuable gases and vapors from large volumes of inert gases. It may be employed to effect the separation of nitrogen from natural gas containing the same, for example natural gas containing 90 per cent methane and higher hydrocarbons and 10 per cent nitrogen. Thus the 90 per cent hydrocarbons may be substantially completely adsorbed in relatively high concentration on a fluidized charcoal adsorbent in accordance with my invention while the major proportion of the nitrogen escapes as tail gas. Only enormous circulating solid adsorbent surface such as is possible in a fluidized bed such as I employ, would make such a project practical for gas transmission lines.

My invention may also be applied to effect the separation of $C_2$ and heavier hydrocarbon fractions, after prior removal of gum-forming constituents from refinery streams and/or natural gas, from more volatile components such as hydrogen, methane, carbon monoxide, nitrogen, oxygen, etc. Thus the process of the present invention may be employed to effect the separation of ethane from methane, ethylene from methane, acetylene from ethylene, etc. Large scale recovery is much more practical and less expensive with the fluidized system of the present invention than with processes using moving beds of granular adsorbent such as the "Hypersorption" process mentioned above.

The system of the present invention may also be used to recover $C_2$ and heavier hydrocarbon gases and volatile vapors of oxygenated hydrocarbon compounds from the reactor effluent gases of the Fischer-gas Tropsch process, after removal of heavy paraffin waxes in order to avoid contamination of the adsorbent therewith.

The process of my invention is completely continuous, each step of the process being carried out continuously and without interruption. This is highly advantageous over batch or intermittent processes which have been proposed heretofore.

Each of the three zones, namely the adsorption zone, the stripping zone and the cooling zone, may take the form of a vertically disposed elongated substantially cylindrical vessel closed at its opposite ends. The bottom may conveniently be of conical shape to facilitate removal of adsorbent settling to the bottom from the vessel. Suitable equipment for separating adsorbent particles from the gaseous or light phase above the lower or dense phase and discharging the separated gas, substantially or completely free from adsorbent particles, from each zone may conveniently be provided within the upper part of each vessel. Such separating equipment preferably takes the form of a cyclone separator of known type located wholly within each zone in the top thereof and arranged to withdraw the supernatant gaseous phase in the upper portion of the zone continuously, to separate the adsorbent therefrom, to discharge the resulting gas through a conduit leading outside the zone and to return the separated adsorbent through a dip leg or standpipe depending from the cyclone to a point well below the level of the dense phase in order to form the necessary seal and prevent gas phase from blowing back up the legs which would nullify the action of the cyclone.

The suspensions of adsorbent in the feed gas, recycle product gas used for stripping and the recycle tail gas used for cooling are introduced upwardly into the lower portions of the adsorber, stripper and cooler respectively under conditions regulated to effect the desired result in each of said zones. Typically the rates of adsorbent introduction and withdrawal from each of the three zones are substantially equal during normal operation of the process. However a concentration of adsorbent particles considerably greater than that prevailing in the incoming suspensions is maintained in the fluid-like adsorbent beds (i. e. in the dense phase) inside the three zones. This result is brought about by correlating the linear velocity of the fluid mixture upwardly through the bed and the average weight and size of the adsorbent particles to give hindered settling of the adsorbent particles in the fluid bed due to the lifting action of the upwardly moving fluid stream working oppositely to the force of gravity on the adsorbent particles. Hindered settling is reduced or substantially eliminated in the upper portion of each of the three zones. If desired this may be accentuated by providing an enlarged upper portion. There is a relatively sharp line of demarcation between the fluid bed proper in which there is pronounced hindered settling and a high adsorbent concentration and a zone at the upper end of the reactor comprising the light phase in which hindered settling is nearly absent and adsorbent concentration is greatly reduced. The lower or dense phase resembles a boiling liquid and the upper or light phase is much like smoke. The level of the dense phase, i. e. the interface between the dense phase and the light phase, is very pronounced and resembles the interface between a liquid and a supernatant gas.

It is highly desirable to introduce the suspensions of adsorbent in gas into each of the three zones through a distributing cone located in the bottom section of the zones. Such a distributing cone is preferably substantially smaller in diameter than the zone and spaced above the bottom thereof (which is preferably conical) in order to allow settling of adsorbent downwardly through the annular space between the distributing cone and the walls of the zone into the space below the distributing cone, whence it may be withdrawn continuously as a relatively compact stream of adsorbent. Such distributing cones aid greatly in the uniform distribution of the suspension over the entire area of the zones. The distributing cones may be provided across their top with foraminous means such as perforated grids for distributing the incoming suspension.

In each zone the degree of hindered settling or backflow of adsorbent particles should be such as to result in thorough mixing and sufficient turbulence in the lower or dense phase portion of the zone to give a substantially uniform temperature distribution throughout the zone.

If desired the upper portions of the three zones that is the adsorbing, stripping and cooling zones, may be enlarged relative to the lower portion thereof in order to aid in the maintenance of hindered settling dense phase conditions in the lower portion and to reduce greatly the amount of adsorbent entrained in the light gaseous phase prevailing in the upper portions of the zones.

It will be understood that suitable provision will be made for the addition of make-up adsorbent as required to compensate for system losses. Generally such make-up adsorbent will be introduced in fresh condition directly to the first suspending step wherein the suspension in the feed gas is prepared for introduction to the adsorbing zone. It will also be understood that if desired suitable provision may be made for withdrawing a stream of the stripped adsorbent continuously to a suitable regeneration unit wherein the adsorbent is treated in suitable manner to remove any contamination thereof. The thus regenerated adsorbent will be recycled to the system. If the regenerated adsorbent is hot it should of course be cooled prior to its return to the adsorber. This cooling may be accomplished conveniently by recycling the regenerated adsorbent to the cooling step of the system. The regeneration may conveniently be accomplished by treatment of the adsorbent with steam at high temperature to remove any contaminants therefrom.

While I much prefer the hindered settling process described above, other types of fluidized contacting may be employed within the broad concept of my invention. However such other types of fluidized contacting are much less preferable because they involve too great a capital outlay for original equipment and are undesirable in other respects among which is the unnecessary complexity and the difficulties encountered in operation.

The temperatures at which adsorption, desorption and cooling are carried out in the practice of my invention, will be obvious to those skilled in the art. Generally speaking I prefer to carry out the adsorption at ordinary temperatures so that the expense of refrigeration is avoided. Generally the desorption is carried out at a considerably elevated temperature. The stripped adsorbent is cooled in the cooling step to a temperature at which it is suitable for reintroduction to the adsorption step. Since the adsorption involves the liberation of heat, it may be desirable to cool the adsorbent in the cooling step to a temperature below that of the incoming feed in order to compensate for such heat of adsorption and consequent temperature rise. Alternatively or additionally the feed gas may be cooled prior to the suspension of the cooled adsorbent therein.

In the accompanying drawing the adsorber, stripper and cooler are shown as combined into a single unit, the adsorber 1 being at the top, the stripper 2 being immediately therebelow and the cooler 3 being at the bottom. A single cylindrical shell which is elongated vertically may be used to form all three zones, this single shell being divided into the three zones by partitions 4 and 5 extending thereacross. The feed enters via line 6 and at point 7 is admixed in any suitable manner with cooled stripped adsorbent flowing in conduit 8 to give a suspension which is conveyed by conduit 9 into adsorber 1. The means for suspending the adsorbent in the stream of feed gas at point 7 may take any form known to the art. The resulting suspension is introduced upwardly in adsorber 1 by distributing cone 10, forming the hindered settling dense phase in the lower portion of zone 1. The upper level of the dense phase is indicated by line 11. The adsorbent which settles out passes around the distributing cone 10 and falls to the bottom of the adsorbing zone being collected as a relatively compact mass above collecting cone 12 and being withdrawn via line 13. Cyclone separator 14 is provided in the top of adsorber 1 and withdraws light gaseous phase continuously through inlet 15, separates the adsorbent therefrom and discharges the resulting tail gas via line 16. The separated solid adsorbent is collected in leg or standpipe 17 which depends from separator 14 to a point well below the level 11 of the dense or hindered settling zone.

The rich solid adsorbent is conveyed by means indicated by reference numeral 13 to a point 18 where it is suspended by any suitable means and in any suitable manner in a stream of heated recycle product gases entering via line 19. The resulting suspension is conveyed by means indicated by numeral 20 upwardly through distributor cone 21 located in stripping zone 2. Hindered settling conditions prevail in the lower portion of zone 2, the level of the dense phase being indicated by numeral 22. The rich adsorbent is held in zone 2 for a sufficient period of time and under conditions such that the adsorbed fraction is substantially completely stripped therefrom by the heat imparted thereto by the heated recycle product gas. The stripped adsorbent collects as a relatively compact mass above collecting cone 23 located in the bottom of zone 2 whence it is withdrawn continuously via means 24. The light gaseous phase in the upper portion of zone 2 is continually sucked into cyclone 25 which separates the product gas substantially free of entrained adsorbent and discharges same via line 26. The separated adsorbent collects in the depending leg of cyclone 25 and is continuously returned thereby to a point below the dense phase level 22.

The product gas stream is split at point 27 into two streams one of which is withdrawn from the system via line 28 and the other of which is passed via line 29 through heater 30, the heated stream being employed to suspend rich adsorbent prior to entry into zone 2. The recycle gas product stream may be heated in any suitable manner. I prefer however to heat it by indirect heat exchange with any suitable heating medium such as steam.

The stripped hot adsorbent is passed via means 24 and 31 to a point 32 where it is suspended in a stream of cooled recycle tail gas flowing in line 33. The resulting suspension is passed by means 34 upwardly into cooling zone 3, being distributed therein by distributing cone 35. Hindered settling conditions prevail in cooling zone 3, the level of the dense phase being indicated by numeral 36. The cooled adsorbent collects in the bottom of zone 3 in collecting cone 37 and is withdrawn continuously by means 8 which conveys it to the point 7 where it is suspended in the incoming feed entering via line 6.

The light gaseous phase prevailing in the upper portion of cooling zone 3 is continuously sucked into cyclone 38 which separates the solid adsorbent therefrom, discharging the resulting tail gas via line 39 and returning the solid adsorbent to a point below the level 36 of the dense phase.

The tail gas discharged via line 16 from the top of adsorbing zone 1 is split into two streams at point 40, one of the streams being withdrawn from the system via lines 41 and 42 and the other stream being recycled via line 43 containing cooler 44 for use in suspending the hot adsorbent and for cooling same in cooling zone 3. Cooler 44 is preferably an indirect cooler, the recycle tail gas being cooled in any suitable manner as by indirect heat exchange with cooling water.

The tail gas flowing in line 39 has been heated by the hot adsorbent in zone 3. It is convenient to merge the stream of tail gas in line 39 with the stream of tail gas in line 41 and to withdraw the composite stream from the system via line 42.

The solid lines in the drawing denote the flow of gas free from adsorbent. The dotted lines denote the flow of relatively compact adsorbent and of suspensions of adsorbent in gas streams.

It will be understood by those skilled in the art that the drawing is schematic only and that details of conveying means, piping, tees, valves, check valves, gas seals, suspending means, etc. have been omitted from the drawing in the interest of simplicity and more ready understanding of the invention. Such details may readily be supplied by those skilled in the art.

For starting up operations, a line 29A is provided for introducing a gas stream into the product recycle line 29 during the starting up period when the amount of product gas from stripping zone 2 is zero or very small in amount. As soon as steady state operation has been instituted, the flow of such extraneous gas through line 29A may be terminated.

The gas supplied during this starting up period may be either (a) steam, (b) product gas from an outside source or (c) tail gas from line 16. The introduction of this gas would be discontinued as soon as the product stream reaches the volume required to supply the heat needed for desorption. I prefer not to use steam in zone 2 after the starting up period because of possible corrosion and other difficulties due to accumulated water. However I do not wish to exclude the possibility that steam or other inert gases may be used along with the recycle product gas for effecting stripping in zone 2, if desired, during the normal process period as well as at the start of operations.

The extraneous gas supplied via line 29A during starting up and/or during normal operation should be one that may be readily separated from the desired product, leaving via line 28, by conventional means within the skill of the art. Steam is very advantageous for starting up because its separation from the product gas is a very simple matter.

It is preferred that the feed gas be free from constituents which would gradually foul up the adsorbent. Accordingly if the feed gas which is available contains such contaminants, it is treated before entering the system in order to remove such objectionable components.

From the foregoing many advantages of my invention will be obvious to those skilled in the art. The principal advantage is that a greatly improved method of separating a gaseous mixture into two fractions is provided. Another advantage is that the equipment requirements are simple and adapted to long life. Another advantage is that the fluidized conditions employed allow enormous surface contact between the finely divided adsorbent and the gases or vapors compared to the "Hypersorption" countercurrent contact system wherein coarse granular adsorbent in the form of a moving bed is employed. My invention utilizes the adsorbent much more completely because the available adsorptive area of a given weight of finely divided adsorbent is enormous compared to that of the same adsorbent in the form of coarse particles. Another advantage is that the problem of formation of fines in my process is completely eliminated whereas it is very serious in continuous countercurrent granular moving bed systems of the prior art. Another advantage is that the invention provides a feasible method of making separations which have been out of the question with previously available systems, an example of such a separation being the removal of nitrogen from natural gas in order to increase the fuel value thereof thereby permitting a deeper extraction of natural gasoline components therefrom. Another advantage is that my invention provides for the stripping of the rich adsorbent by means of product gas itself so that no contamination whatsoever of the stripped material or of the adsorbent is encountered. The heating of the rich adsorbent by means of heated product gas is further advantageous since heat transfer is much improved over heating by indirect means such as steam coils. Still another advantage of my invention is that the stripped hot adsorbent is cooled by a stream of cooled tail gas itself whereby excellent heat transfer is attained in the cooling zone and contamination of the cooled adsorbent with the cooling agent is avoided because the cooling agent is either not adsorbed to any appreciable extent or if it is adsorbed it does not objectionably contaminate the adsorbent.

It should be pointed out however that, in some cases at least, the gas which is not adsorbed in zone I (i. e. the tail gas), because of the preferential adsorption of the product gas, would be adsorbed to some extent in zone 3 where the concentration of product gas is very low. If this occurs, the adsorbed tail gas would then be replaced by the more readily adsorbed product gas when the adsorbent reaches zone I so the net result is the same as if the tail gas were not adsorbed in the cooling step, viz. the adsorbent is not contaminated by an extraneous gaseous medium which might be used instead of tail gas for direct cooling of the adsorbent.

Another advantage is that my invention provides a unitary process and apparatus for the separation of gaseous mixtures into two fractions, each step or unit of the equipment cooperating with the rest of the process or equipment.

Numerous other advantages of my invention will be apparent to those skilled in the art.

As is indicated by the appended claims, as well as by the foregoing description, my invention has both process and apparatus aspects. I believe that I am the first to provide a process and apparatus of the type described herein.

I claim:

1. A process for effecting the separation of a gaseous mixture into two fractions which comprises suspending a finely divided solid adsorbent in said mixture under conditions such as to effect adsorption of a fraction of said mixture by said adsorbent, separating the resulting adsorbent, suspending the resulting adsorbent in a heated recycle stream of stripped product gas under conditions such as to effect desorption of the adsorbent, separating the resulting stripped adsorbent, suspending the resulting stripped adsorbent in a cooled recycle stream of tail gas under conditions such as to effect cooling of said adsorbent, separating the resulting cooled adsorbent and recycling same to said first-named suspending step.

2. A process for effecting the separation of a gaseous mixture into two fractions which comprises suspending a finely divided solid adsorbent in said mixture under conditions such as to effect adsorption of a fraction of said mixture by said adsorbent, separating the resulting adsorbent, suspending the resulting adsorbent in a heated recycle stream of stripped product gas under conditions such as to effect desorption of the adsorbent, and separating the resulting stripped adsorbent.

3. A process for effecting the separation of a gaseous mixture into two fractions which comprises suspending a finely divided solid adsorbent in said mixture in an adsorbing zone under conditions such as to effect adsorption of a fraction of said mixture by said adsorbent, separating the resulting rich adsorbent from unadsorbed tail gas, suspending said rich adsorbent in a heated stream of stripped product gas in a separate stripping zone under conditions such as to effect desorption of the adsorbed fraction from the rich adsorbent and merger of the desorbed fraction with said stripped product gas, separating the resulting stripped adsorbent from the resulting product gas, cooling said stripped adsorbent and recycling same to said first-named suspending step, and separately withdrawing tail gas and product gas from the system as said two fractions.

4. A process for effecting the separation of a gaseous mixture into two fractions which comprises suspending a finely divided solid adsorbent in said mixture under conditions such as to effect adsorption of a fraction of said mixture by said adsorbent, separating the resulting adsorbent from unadsorbed tail gas, stripping said adbsorbent by heating same, cooling the stripped adsorbent by suspending same in a cooled recycle stream of tail gas under conditions such as to effect cooling of said adsorbent, separating the resulting cooled adsorbent and recycling same to said first-named suspending step.

5. A process for effecting the separation of a gaseous mixture into two fractions which comprises suspending a finely divided solid adsorbent in said mixture in an adsorbing zone under conditions such as to effect adsorption of a fraction of said mixture by said adsorbent, separating the resulting rich adsorbent from unadsorbed tail gas, splitting said tail gas into a stream withdrawn from the system and a recycle stream, cooling said recycle stream, stripping the rich adsorbent by heating same, separating the resulting stripped adsorbent from the resulting product gas, cooling said stripped adsorbent by suspending same in said cooled recycle stream of tail gas, separating the resulting cooled adsorbent from the resulting gas, and recycling said cooled adsorbent to said adsorbing step as the adsorbent therefor.

6. A process for effecting separation of a gaseous mixture into two fractions which comprises suspending a finely divided solid adsorbent in a stream of said gaseous mixture and introducing the resulting suspension upwardly in an adsorbing zone, maintaining conditions of temperature and contact time in said zone such as to effect adsorption of a fraction of said mixture by said adsorbent and correlating the linear velocity of gases moving upwardly in said zone with weight and size of adsorbent particles in said zone so as to settle resulting adsorbent in said zone, withdrawing tail gas free from adsorbent from the upper portion of said zone, withdrawing the settled adsorbent from the bottom of said zone, suspending said withdrawn adsorbent in a heated recycle stream of stripped product gas and introducing the resulting suspension upwardly in a stripping zone, maintaining conditions of temperature and contact time in said stripping zone such as to effect desorption of the adsorbed fraction from the adsorbent and correlating linear velocity of gases moving upwardly in said zone with weight and size of adsorbent particles in said zone so as to settle resulting stripped adsorbent in said zone, withdrawing the resulting gas free from adsorbent from the upper portion of said zone, splitting the withdrawn gas into a product stream withdrawn from the system and a recycle stream, heating said recycle stream and employing the heated recycle stream to effect desorption in the manner stated above, withdrawing the stripped adsorbent from the bottom of said stripping zone, splitting said tail gas into a stream withdrawn from the system and a recycle stream, cooling said recycle stream, suspending said withdrawn stripped adsorbent in said cooled recycle stream of said tail gas and introducing the resulting suspension upwardly in a cooling zone, maintaining conditions of temperature and contact time in said cooling zone such as to effect cooling of said adsorbent to the temperature at which it is desired to re-introduce it into said adsorbing zone, and correlating linear velocity of gases moving upwardly in said cooling zone with weight and size of adsorbent particles in said zone so as to settle resulting cooled adsorbent in said cooling zone, withdrawing the resulting gas free from adsorbent from the upper portion of said cooling zone, merging the stream of gas so withdrawn from said cooling zone with the stream of tail gas withdrawn from the system, withdrawing the cooled adsorbent from the bottom of said cooling zone, and recycling said withdrawn cooled adsorbent to said first-named step.

7. Apparatus for separating a gaseous mixture into two fractions which comprises a vertical elongated adsorbing zone, a vertical elongated stripping zone, a vertical elongated cooling zone, means for introducing a suspension of finely divided solid adsorbent vertically upwardly in each of said zones, means for correlating linear velocity of gases moving upwardly in each of said zones with weight and size of adsorbent particles in each of said zones so as to cause formation of a dense phase in the lower portion of each of said zones and to settle adsorbent from said dense phase to the bottom of each of said zones, means for withdrawing so separated adsorbent from the bottom of each of said zones, a cyclone separator in the upper portion of each of said zones adapted to withdraw light gaseous phase therefrom to separate gas free of adsorbent and discharge same out of said zones, each separator having a leg depending therefrom to a point below the level of the dense phase in each of said zones, a feed conduit, means for suspending adsorbent in the feed and conveying the resulting suspension to said adsorbing zone, means for conveying adsorbent withdrawn from the bottom of said adsorbing zone and suspending same in a heated stream of recycle product gas and conveying the resulting suspension to said stripping zone, means for conveying adsorbent withdrawn from the bottom of said stripping zone and suspending same in a cooled stream of recycle tail gas and conveying the resulting suspension to said cooling zone, means for conveying adsorbent withdrawn from said cooling zone to said first-named suspending means, a conduit for tail gas discharged by the cyclone separator in said adsorbing zone, two conduits connected to said last-named conduit one of which conveys tail gas to be withdrawn from the system and the other of which conveys recycle tail gas to be used for cooling said adsorbent, a cooler in said recycle tail gas conduit, a conduit for conveying tail gas discharged by the cyclone separator in said cooling zone and merging same with said tail gas withdrawn from the system, a conduit for conveying stripped and stripping product gas discharged by the cyclone separator in said stripping zone, two conduits connected to said last-named conduit one of which conveys product gas withdrawn from the system and the other of which conveys recycle product gas to be used for stripping said adsorbent, and a heater in said recycle product gas conduit.

8. Apparatus as in claim 7 wherein said adsorbing zone, said stripping zone and said cooling zone are superimposed portions of a single cylindrical vertical elongated vessel, the adsorbing zone being uppermost, the cooling zone being lowermost and the stripping zone being therebetween.

9. Apparatus for effecting separation of a gaseous mixture into two fractions which comprises a vertical adsorbing zone, means for suspending a finely divided solid adsorbent in a stream of said gaseous mixture and for introducing the resulting suspension into said zone and causing said adsorbent to contact said mixture in said zone at a temperature and for a period of time such as to effect adsorption of a fraction of said mixture by said adsorbent, means for correlating linear velocity of gases moving upwardly in said zone with weight and size of adsorbent particles in said zone so as to settle resulting adsorbent in said zone, means for withdrawing tail gas free from adsorbent from the upper portion of said zone, means for withdrawing said settled adsorbent from the bottom of said zone, a vertical stripping zone located below said adsorbing zone, means for withdrawing stripped gaseous product free from adsorbent from the upper portion of said stripping zone, means for splitting said withdrawn stripped gaseous product into a product stream and a recycle stream, means for heating said recycle stream, means for suspending said adsorbent withdrawn from said adsorbing zone in said heated recycle stream and for introducing the resulting suspension into said stripping zone and causing said adsorbent thereby to be heated to a temperature for a period of time such as to effect desorption of the adsorbed fraction from said adsorbent, means for correlating linear velocity of gases moving upwardly in said stripping zone with weight and size of adsorbent particles in said stripping zone so as to settle resulting stripped adsorbent in said stripping zone, means for withdrawing said settled stripped adsorbent from the bottom of said stripping zone, a vertical cooling zone located below said stripping zone, means for splitting said withdrawn tail gas into a stream withdrawn from the system and a recycle stream, means for cooling said recycle tail gas stream, means for suspending said stripped adsorbent withdrawn from said stripping zone in said cooled recycle tail gas stream and for introducing the resulting suspension into said cooling zone and causing said adsorbent thereby to be cooled to the temperature at which it is to be re-introduced into said adsorbing zone, means for correlating linear velocity of gases passing upwardly in said cooling zone with weight and size of adsorbent particles in said cooling zone so as to settle resulting cooled adsorbent in said cooling zone, means for withdrawing tail gas free from adsorbent from the upper portion of said cooling zone, means for merging said tail gas so withdrawn with said stream of tail gas withdrawn from the system, means for withdrawing said settled adsorbent from the bottom of said cooling zone, and means for conveying said withdrawn cooled adsorbent to said first-named means.

10. A process for effecting separation of a $C_2$ and heavier hydrocarbon fraction from a gaseous mixture containing same together with methane and hydrogen, said mixture being free of gum-forming constituents, which comprises suspending activated charcoal having a particle size of from 100–300 mesh in a stream of said mixture and introducing a resulting suspension upwardly in an adsorbing zone, maintaining conditions of temperature and contact time in said zone such as to effect adsorption of said $C_2$ and heavier hydrocarbon fractions contained in said stream of said mixture by said adsorbent and correlating linear velocity of gases moving upwardly in said zone with weight and size of adsorbent particles in said zone so as to settle resulting adsorbent in said zone, withdrawing a tail gas containing said methane and hydrogen free from adsorbent from the upper portion of said zone, withdrawing settled adsorbent from the bottom portion of said zone, suspending said withdrawn adsorbent in a heated recycle stream of stripped product gas and introducing a resulting suspension upwardly in a stripping zone, maintaining conditions of temperature and contact time in said stripping zone such as to effect desorption of adsorbed $C_2$ and heavier hydrocarbon fractions from the adsorbent and correlating linear velocity of gases moving upwardly in said zone with weight and size of adsorbent particles in said zone so as to settle resulting stripped adsorbent in said zone, withdrawing a resulting gas containing $C_2$ and heavier hydrocarbon fractions free from adsorbent from the upper portion of said zone, splitting the withdrawn gas into a product stream withdrawn from the system and a recycle stream, heating said recycle stream and employing a resulting heated recycle stream to effect desorption in the manner stated above, withdrawing a stripped adsorbent from the bottom portion of said stripping zone, splitting said tail gas into a stream withdrawn from the system and a recycle stream, cooling said recycle stream, suspending said withdrawn stripped adsorbent in said cooled recycle stream of said tail gas and introducing a resulting suspension upwardly in a cooling zone, maintaining conditions of temperature and contact time in said cooling zone such as to effect cooling of said adsorbent to a temperature at which it is desired to re-introduce it into said adsorbing zone and correlating linear velocity of gases moving upwardly in said cooling zone with weight and size of adsorbent particles in said zone so as to settle resulting cooled adsorbent in said cooling zone, withdrawing a resulting gas free from adsorbent from the upper portion of said cooling zone, merging the stream of gas so withdrawn from said cooling zone with the stream of tail gas withdrawn from the system, withdrawing a cooled adsorbent from the bottom portion of said cooling zone, and recycling said withdrawn cooled adsorbent to said first-named step.

11. A process for making a separation between $C_2$ hydrocarbons and methane contained in a gaseous mixture, said mixture being free of gum-forming constituents, which comprises the following steps: suspending activated charcoal having a particle size of from 100 to 300 mesh in a stream of said mixture; introducing a resulting suspension upwardly in an adsorbing zone, said adsorbing zone operating at such a temperature as to effect adsorption of $C_2$ hydrocarbons from said mixture by said adsorbent; correlating linear velocity of gases moving upwardly in said zone with weight and size of adsorbent particles in said zone so as to settle resulting adsorbent in said zone; withdrawing tail gas containing methane free from adsorbent from the upper portion of said zone; withdrawing settled adsorbent containing adsorbed $C_2$ hydrocarbons from the bottom portion of said zone, suspending said withdrawn adsorbent in a heated recycle stream of stripped product gas; introducing a resulting suspension upwardly in a stripping zone, said stripping zone operating at such a temperature and said heated stripping gas contacting said adsorbent for a sufficient time so as to effect desorption of adsorbed $C_2$ hydrocarbons from said adsorbent; correlating linear velocity of gases moving upwardly in said zone with weight and size of adsorbent particles in said zone so as to settle resulting stripped adsorbent in said zone; withdrawing a resulting gas containing $C_2$ hydrocarbons free from adsorbent from the upper portion of said zone; splitting said withdrawn gas into a product stream withdrawn from the system and a recycle stream; heating said recycle stream and employing a resulting heated recycle stream to effect desorption in the manner stated hereinbefore; withdrawing said stripped adsorbent from the bottom portion of said stripping zone; splitting said tail gas into a stream withdrawn from the system and a recycle stream; cooling said recycle stream; suspending said withdrawn stripped adsorbent in said cooled recycle stream of said tail gas; introducing a resulting suspension upwardly in a cooling zone, said cooling zone operating at such a temperature and said cooled recycle stream contacting said stripped adsorbent for a sufficient time so as to effect cooling of said adsorbent to a temperature at which it is desired to re-introduce it into said adsorbing zone; correlating linear velocity of gases moving upwardly in said cooling zone with weight and size of adsorbent particles in said zone so as to settle resulting cooled adsorbent in said cooling zone; withdrawing a resulting gas free from adsorbent from the upper portion of said cooling zone; withdrawing a cooled adsorbent from the bottom portion of said cooling zone; and recycling said withdrawn cooled adsorbent to said first-named step.

12. A process for effecting the separation of a gaseous mixture into two fractions which comprises, suspending a finely divided solid adsorbent in said mixture in an adsorbing zone under conditions such as to effect adsorption of a fraction of said mixture by said adsorbent, separating resulting rich adsorbent from unadsorbed tail gas, suspending said rich adsorbent in a heated stream of stripped product gas in a separate stripping zone under conditions such as to effect desorption of said adsorbed fractions from said rich adsorbent and merger of said desorbed fractions with said stripped product gas, separating resulting stripped adsorbent from resulting product gas, cooling a portion of said tail gas, cooling said stripped adsorbent by suspending same in said cooled portion of said tail gas in a separate cooling zone, separating resulting cooled adsorbent from resulting gas, and recycling said cooled adsorbent to said adsorbing step as said adsorbent thereof.

13. The process of claim 4 wherein said finely divided solid adsorbent is activated charcoal.

14. A process for effecting the separation and recovery of normally gaseous hydrocarbons higher boiling than methane from a gaseous mixture consisting essentially of low-boiling normally gaseous materials including methane, said higher-boiling hydrocarbons being present in said mixture in a relatively small amount as compared to said methane, which comprises, suspending finely divided activated charcoal in said mixture under conditions such as to effect adsorption of said hydrocarbons higher boiling than methane by said activated charcoal, separating resulting activated charcoal from unadsorbed tail gas, stripping said resulting activated charcoal by heating same, cooling resulting stripped activated charcoal by suspending same in a cooled stream of tail gas under conditions such as to effect cooling of said resulting stripped activated charcoal, separating resulting cooled activated charcoal and passing same to said first-named suspending step.

SAM P. ROBINSON.

REFERENCES CITED

The following references are of record in the file of this patent:

UNITED STATES PATENTS

| Number | Name | Date |
|---|---|---|
| 1,825,707 | Wagner | Oct. 6, 1931 |
| 1,836,301 | Bechthold | Dec. 15, 1931 |
| 1,957,251 | Dean | May 1, 1934 |
| 2,270,903 | Rudbach | Jan. 27, 1942 |
| 2,344,449 | Ogorzaly | Mar. 14, 1944 |
| 2,354,383 | Kiesskalt | July 25, 1944 |
| 2,386,734 | Wolk | Oct. 9, 1945 |
| 2,391,334 | Nicholson | Dec. 18, 1945 |
| 2,396,709 | Leffer | Mar. 14, 1946 |
| 2,397,566 | Schutte | Apr. 2, 1946 |
| 2,420,542 | Jahnig | May 13, 1947 |
| 2,422,262 | Russell | June 17, 1947 |